United States Patent [19]

McDonald

[11] Patent Number: 4,505,184
[45] Date of Patent: Mar. 19, 1985

[54] AIR DISTRIBUTOR FOR SEQUENTIALLY CONTROLLING AIR OPERATED APPARATUS

[75] Inventor: James S. McDonald, Bethany, Okla.

[73] Assignee: AT&T Technologies, Inc., New York, N.Y.

[21] Appl. No.: 454,798

[22] Filed: Dec. 30, 1982

[51] Int. Cl.³ ............................................. F15B 21/02
[52] U.S. Cl. ........................................ 91/39; 91/467; 137/625.23; 137/624.13
[58] Field of Search ............... 91/467, 39; 137/625.22, 137/625.23, 625.24, 624.13, 624.15, 625.21; 251/174

[56] References Cited

U.S. PATENT DOCUMENTS

| | | | |
|---|---|---|---|
| 2,946,348 | 7/1960 | North | 137/625.21 |
| 3,022,738 | 2/1962 | Krute | 91/39 |
| 3,098,505 | 7/1963 | Zappia | 137/625.22 |
| 3,134,403 | 5/1964 | Rudelick | 137/625.16 |
| 3,513,981 | 5/1970 | Mendelow | 210/411 |
| 3,534,718 | 10/1970 | Pasquin | 137/625.24 |
| 3,543,799 | 12/1970 | Hayman | 137/625.2 |
| 3,610,446 | 10/1971 | Palumbo | 214/17 R |
| 4,285,365 | 8/1981 | Coats et al. | 137/625.11 |
| 4,345,507 | 8/1982 | Simpson et al. | 251/174 |

*Primary Examiner*—Robert E. Garrett
*Assistant Examiner*—John M. Husar
*Attorney, Agent, or Firm*—R. P. Miller; M. de Picciotto

[57] ABSTRACT

A rotor (23) is mounted for rotation in a housing (10) having a pressure chamber (31) and an exhaust chamber (33) formed about the rotor. The rotor is provided with slots (36 and 37) which are moved sequentially in pairs into alignment with plungers (48 and 68). When a plunger (48) partially overlays a slot (36), pressurized air passes from chamber (32), through an exposed portion of a slot (36), through plungers openings (49, 44, and 43) to one end of an air cylinder (12) while exhaust atmospheric pressure is presented from chamber (33), through an exposed portion of a slot (37), through a plunger openings (71, 67, 64, and 63) to the opposite end of the air cylinder (12) to permit movement of a piston (83) to drive some external mechanism.

15 Claims, 11 Drawing Figures

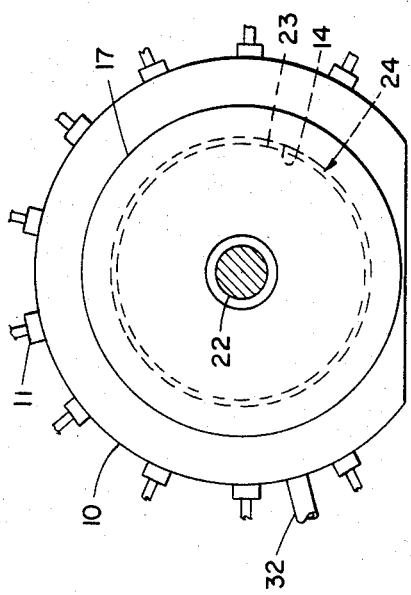
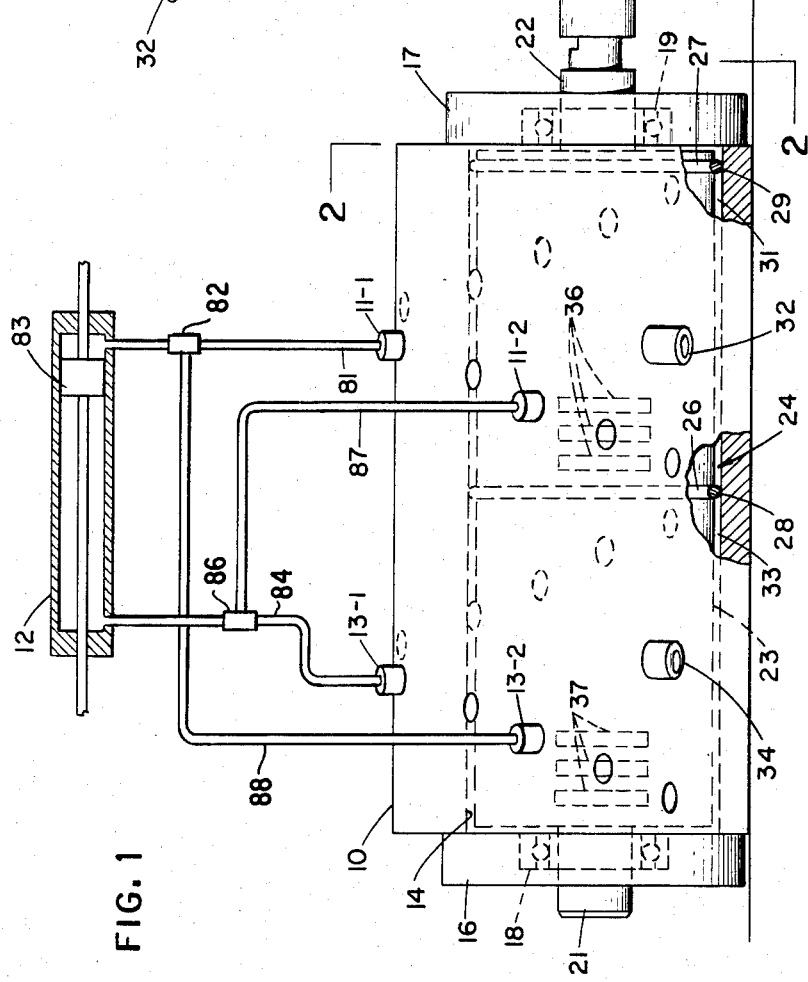
FIG. 2
FIG. 1

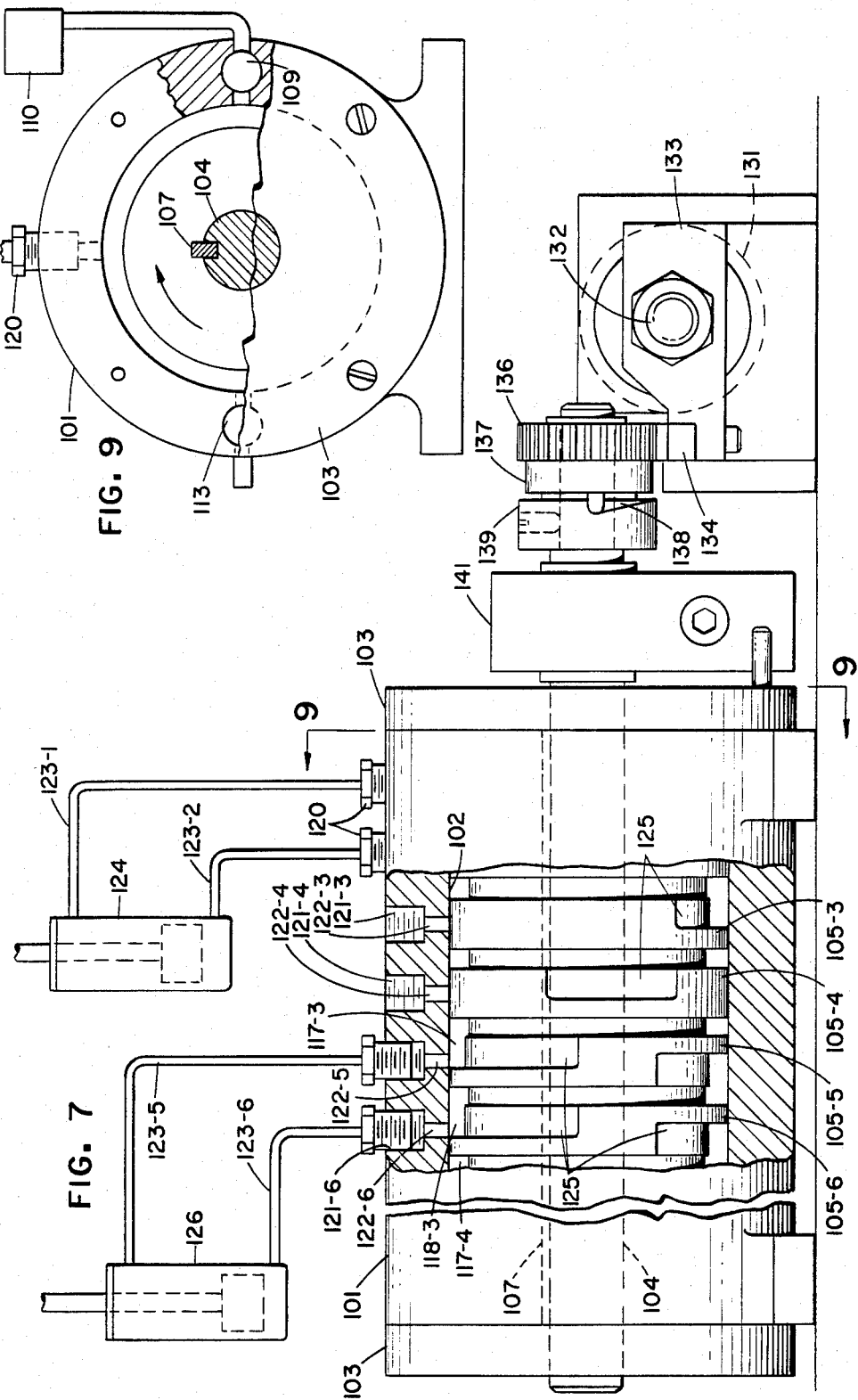

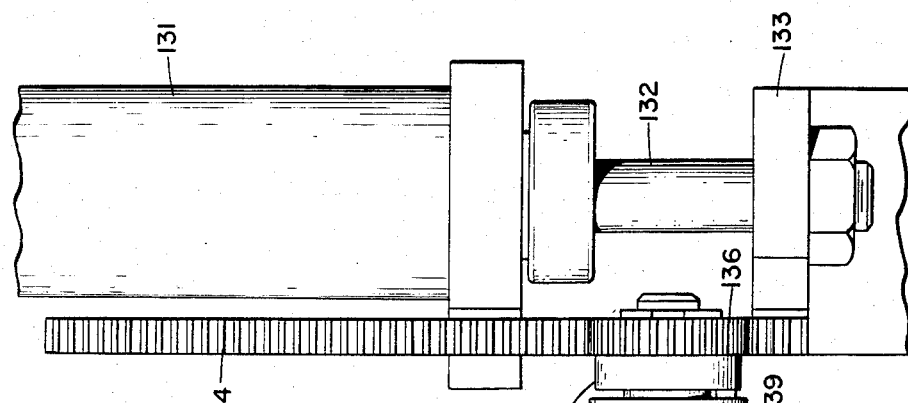
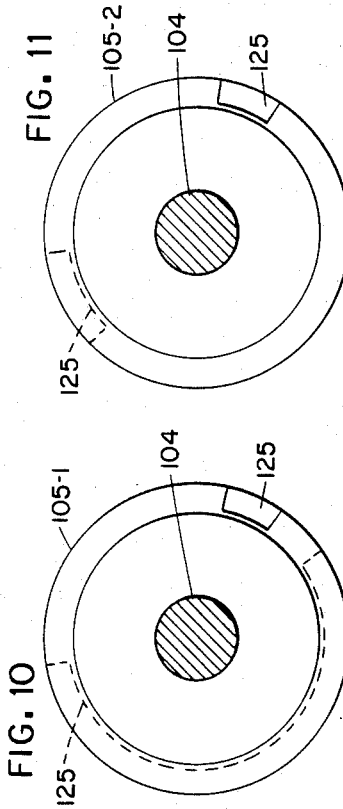
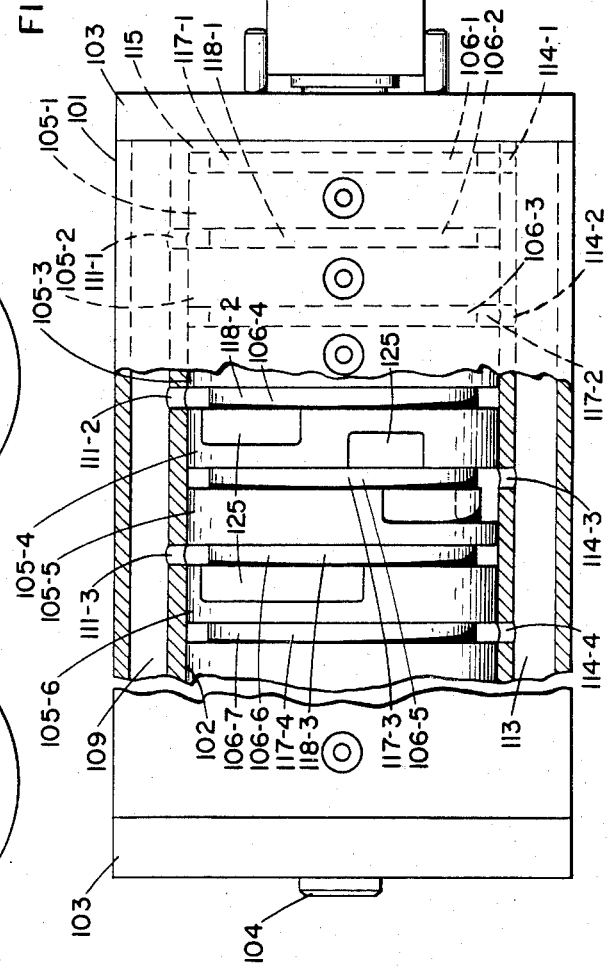

AIR DISTRIBUTOR FOR SEQUENTIALLY CONTROLLING AIR OPERATED APPARATUS

FIELD OF INVENTION

This invention relates to distributors for sequentially applying pressurized fluids to a series of fluid operated devices, and more particularly, to a distributor for sequentially applying pneumatic pressure to a series of air cylinders which function to control the operation of a multi-unit machine or a series of discrete machines.

BACKGROUND OF THE INVENTION

Complex machines having a number of air operated tools and work feeding subassemblies are often controlled by sequentially operating a number of air cylinders. The operations of the air cylinders are programmed by sequentially operating solenoids or fluid operated valves associated with the air cylinders. The programming is usually obtained by cam units, relay circuits, electronic sequencers, or software controlled microprocessors or computers. In all of these programming systems, electrical circuits are utilized which terminate at the solenoid controlled valves associated with the air cylinders.

There are needs for simple, rugged, all mechanical devices that function to sequentially deliver pressurized fluid and non-pressurized fluid to a number of utilization devices, such as air cylinders associated with multi-unit machines. Rotary valves have been used for years in a number of industries to control the application of fluids to various machine units. In U.S. Pat. No. 4,285,365 issued Aug. 25, 1981 to G. C. Coates, et al., there is disclosed a rotary valve having a rotor with a number of axially and circumferentially spaced pockets that are sequentially presented to a series of laterally aligned exit ports. The lengths of the pockets are designed to exceed the length of the ports so that portions of the pockets may be exposed to the ports while remaining portions are exposed pressurized fluid passes through the portion of the pocket exposed to the housing, through the pocket and then through the portion of the pocket aligned with and exposed to the exit ports whereafter fluid is applied to a utilization apparatus, such as a washing machine.

Rotary air distributors are available to sequentially operate banks of air cylinders which in turn control the operation of an associated apparatus. One such air distributor is shown in U.S. Pat. No. 3,610,446 issued Oct. 5, 1971 to P. Palumbo wherein a rotor is provided with sets of veins to selectively furnish pressurized fluid to the first sides of associated fluid operated cylinders while second sets of veins on the rotor are effective to complete passage to vent second sides of the same associated fluid operated cylinders. A number of associated fluid operated cylinders are thus sequentially operated to control the operation of a series of devices, such as coke oven wharf gates.

SUMMARY OF INVENTION

In general, this invention contemplates, among other things, a pressurized air distributor for operating a series of air controlled devices, e.g., air cylinders, wherein the distributor features a rotor having peripheral slots which is rotated in a housing to interpose pairs of slots between venting and pressurized air chambers within the housing and exit ports connected by conduits to operate the air controlled devices.

More particularly, in one embodiment of the invention, a housing having a venting chamber section and a pressurized air chamber section serves as a mounting for a first series of spring urged centrally apertured plungers and a second series of spring urged centrally apertured plungers. Each series of plungers extend through the housing to ride on a rotor that is spaced from the inner wall of the housing. The rotor is formed with two series of peripheral slots which are arranged to sequentially move in pairs into alignment with plungers from the respective two series of plungers. The rotor engaging face of each plunger is dimensioned to have a width exceeding the width of each associated rotor slot and a length that is less than the length of the associate rotor slot. The plungers are connected in pairs through air lines to rearward and forward sections of an array of air cylinders that are utilized to operate component mechanisms in a machine or in the alternative to operate selected ones of a number of discrete devices.

In operation, the rotor is rotated to sequentially present pairs of slots, one of which opens to the venting section and the other of which opens into the pressurized section, to pairs of plungers. Due to the dimenions of the plungers, each associated pair of plungers bridges a pair slots in the rotor to permit pressurized air to pass through the central aperture of a first plunger while exposing the venting section to a central aperture of a second plunger. Pressurized air and venting atmospheric pressure are presented to the conduits running to opposite ends of an associated air cylinder to initiate movement of a piston within the air cylinder.

DESCRIPTION OF THE DRAWINGS

Other features and advantages of the invention will be understood and appreciated upon consideration of the following detail description when considered in conjunction with the drawing wherein:

FIG. 1 is a side elevational view of an air distributor for sequentially applying pressurized air and atmospheric venting pressure to a series of air operated devices in accordance with the principles of the invention;

FIG. 2 is an end view of the air distributor shown in FIG. 1;

FIG. 7 is a side elevation view of an alternative embodiment of the invention wherein an air distributor sequentially applies air and venting atmosphere to operate a number of air operated devices.

FIG. 8 is a top plane view of a substantial portion of the air distributor shown in FIG. 7 and particularly illustrates the location of pressurized air and venting manifolds;

FIG. 9 is an end view of the air distributor shown in FIG. 7, and particularly illustrates a central shaft for driving a plurality of slotted discs to selectively control the application of pressurized air and venting air to the air operated devices; and FIGS. 10 and 11 show two typical discs which are utilized to selectively control the application of compressed air or venting air to the air operated devices.

DETAILED DESCRIPTION

Figure 3:
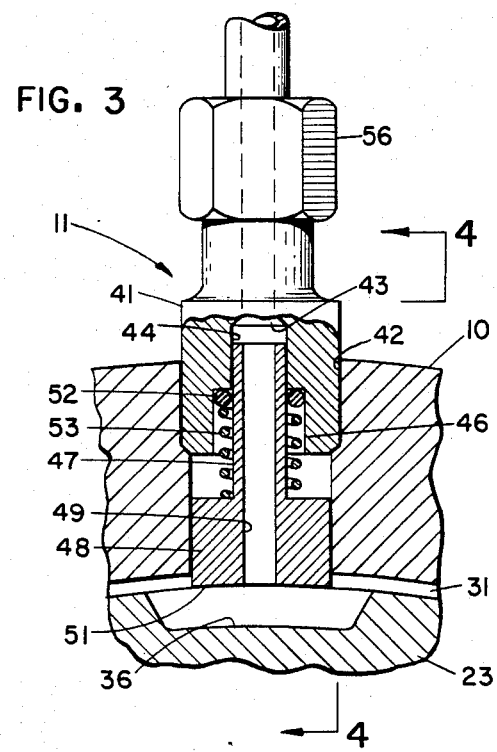
FIG. 3 is a sectional view of a pressurized air applying plunger riding on a slotted rotor rotating in a pressure chamber.

Considering the air distributor in general and referring to FIG. 1, there is disclosed a housing 10 having a first spiral array of pressure fittings 11 projecting from and into the housing for selectively applying pressurized air to operate a number of air cylinders, only one of which is shown and designated by the reference numeral 12. The housing is also provided with a second spiral array of exhaust fittings 13 projecting from and into the housing for selectively applying atmospheric pressure to an air cylinder in conjunction with the application of pressurized air to facilitate the operational response of the air cylinder to the application of the pressurized air.

The housing may be constructed of bronze, steel, aluminum or strong plastic and is formed with an inner cylindrical wall 14. End plates 16 and 17 are secured to the housing to enclose an inner cylindrical chamber and provide a mounting for a pair of roller bearings 18 and 19. Journalled within these bearings are a pair stud shafts 21 and 22 respectively connected to opposite ends of an inner cylindrical rotor 23 which may also be constructed of metal or a rugged plastic. The diameter of the rotor is selected to be smaller than the diameter of the cylindrical wall to provide a chamber 24 between the rotor and the wall. A pair of grooves 26 and 27 are formed in the rotor, one in the vicinity of the first end of the rotor and the other in the vicinity of the mid-section of the rotor. Resilient O-rings 28 and 29 are individually positioned in the grooves and project outwardly to engage and ride on the cylindrical wall. The O-rings 28 and 29 act to seal and define a pressure chamber 31 into which may be impressed through an entry port 32, a pressurized fluid, such as compressed air from an external source (not shown). The left hand section of the chamber 24 formed between the rotor and the cylindrical wall is designated an exhaust chamber 33. The exhaust chamber is vented through a port 34 to the atmosphere.

The rotor 23 is formed with a first series of axially aligned annular slots 36 which are contained in the pressure chamber 31. A second series of axially aligned annular slots 37 are formed in the rotor and are contained within the exhaust chamber 33. The slots 36 and 37 are also arranged to be individually circumferentially aligned with the fittings 11 and 13 so that during a rotation of the rotor the slots will be sequentially moved into alignment with the fittings 11 and 13. The two spiral arrays of fittings are similarly deployed so that each fitting in the first array is laterally aligned with a fitting in the second array. When the rotor is rotated, the movement of each slot in the first series into alignment with a fitting 11 in the first array is accompanied by movement of a slot 37 in the second series into alignment with a fitting 13 in the second array.

Figure 4:
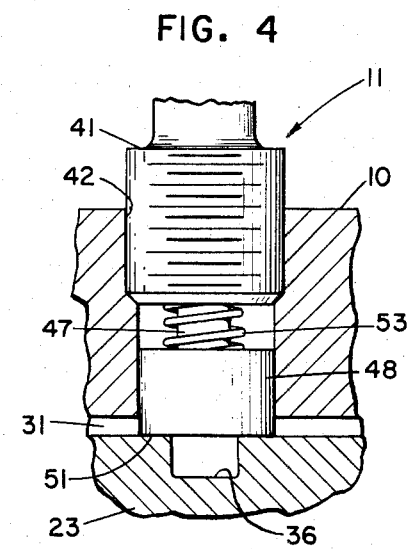
FIG. 4 is a side sectional view taken along line 4—4 of FIG. 3 showing the relative width of the plunger with respect to the width of a pressure slot formed in the rotor.

Turning now to FIGS. 3 and 4 for a consideration of the construction of a typical pressure fitting 11, there is shown a plug 41 seated in an aperture 42 bored in the housing 10. The plug is bored to provide a passageway 43 extending to a cylindrical hole 44 which in turn terminates in a cylindrical cavity 46. Slideably seated in a hole 44 is a tubular stem 47 projecting from a plunger 48 having a central hole 49 terminating a port opening in the pressure chamber 31. The plunger which may be circular or rectangular in shape is formed with an arcuate face 51 that rides on the surface of the cylindrical rotor 23. An O-ring 52 is seated in the bottom of the cavity 46 and is engaged by a compression spring 53 which encircles the stem 47 and bears against the top of the plunger 48. The spring 52 is maintained compressed to bear against and seat the O-ring in the cavity thus sealing the juncture of the stem 47 with the wall of the central hole 44. The spring 52 also acts to force the plunger 48 downwardly to firmly engage the arcute face of the plunger with the surface of the rotor. Each fitting 11 is also provided with a coupling device 56 to enable the connection of the fitting to a conduit running to an air cylinder.

As shown in FIG. 3, the diameter or length of the arcuate face 51 of the plunger 48 is less than the circumferential length of an associated slot 36 formed in the rotor 23. However, as shown in FIG. 4, the diameter or width of the plunger face 51 is greater than the width of the associated slot 36, so that when the rotor moves a slot in alignment with a plunger, the plunger will ride over the slot. As the rotor moves a slot 32, relative to the face 51 of the plunger, pressurized air in the chamber 31 passes through the uncovered trailing and/or leading section(s) of the slot into the opening 49 formed in the plunger.

Figure 5:
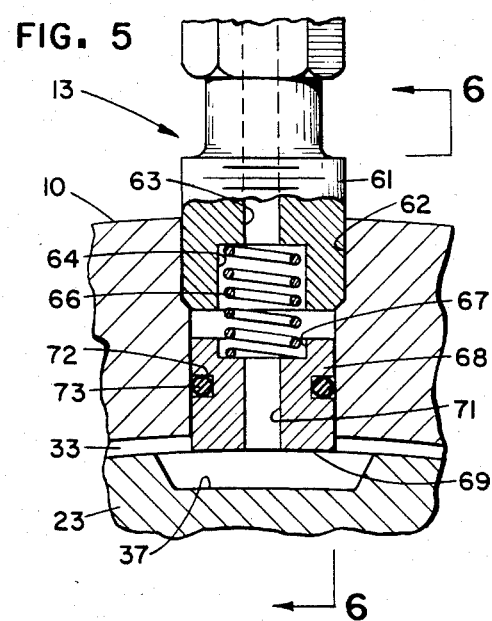
FIG. 5 is a partial section view of a venting plunger riding on the slotted rotor in a venting chamber.
Figure 6:
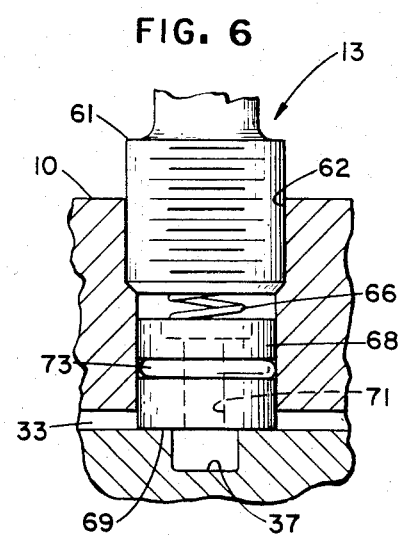
FIG. 6 is a side sectional view taken along line 6—6 of FIG. 5 showing the relative width of the venting plunger with respect to the width of a venting slot formed in the rotor.

Referring to FIGS. 5 and 6, there is illustrated the construction of a typical fitting 13 utilized to apply exhaust or atmospheric pressure to a controlled air cylinder. Again, the fitting comprises a plug 61 that is seated or threaded into an aperture 62 formed in the housing 10. The plug is provided with a passageway 63 running into a cavity 64 for receiving a compression spring 66. The spring bears against a bottom of a hole 67 formed in a plunger 68 which has an arcuate face 69 that bears against the periphery of the rotor 23. The cavity 67 communicates with a bore 71 extending through the body of the plunger and terminating in a port in the exhaust chamber 33. In this instance, the plunger 68 is provided with an encircling peripheral slot 72 into which is seated an O-ring 73 to provide a seal between the outer wall of the plunger and the wall of the aperture 62 formed in the housing. The plunger 68 may be circular or rectangular in shape and is so dimensioned that the diameter or length of arcuate face 69 is less than the length of a slot 37 formed in the rotor. As depicted in FIG. 6, the diameter or width of the plunger face 69 is dimensioned to be greater than the width of the slot 37 thus permitting the plunger to ride over the slot when the rotor is rotated. The fitting 13 is mounted in the exhaust section of the housing and when a slot 37 is moved in communication with the bore 71, exhaust or atmospheric pressure is impressed through the fitting 13. The chamber 33 is usually maintained at atmospheric pressure by virtue of the exhaust port 34 opening to the surrounding atmosphere.

In operation of the air distributor, continuous or intermittent rotative power is applied to the shaft 22 by a drive motor 75 to rotate the rotor to successfully bring the slots 36 into register with the fittings 11, while at the same time the corresponding laterally aligned slots 37 in the exhaust section are successfully brought into registration with the fittings 13. The alignment of a slot 36 with a fitting 11-1 allows pressurized air to pass through the exposed sections of a slot, through the aligned openings 49, 44, and 43 in the fitting and from there, through a conduit 81, running to an air cylinder, such as air cylinder 12. Conduit 81 is connected through a T-fitting 82 to the right end of the air cylinder whereupon pressurized air is applied to move an internal piston 83 toward the left. At this time, a slot 37 is moved into alignment with a fitting 13-1 in the exhaust section of the housing. Atmospheric pressure is thus impressed through the aligned slot 37 and the openings 71, 67, 64, and 63 extending through the fitting. A coupling similar to the coupling 56 is utilized to connect the fitting to a conduit 84 running through a T-fitting 86 to the left of the air cylinder 12. It may be thus appreciated that the air within the cylinder 12 compressed by the moving piston 83 is exhausted through the T-fitting 86, the line 84 and the fitting 13-1 whereafter the exhaust air is passed through the slot 37 into the chamber 24 to be exhausted through the port 34.

The air cylinder 12 is reversed when another slot 36 is rotated in alignment with another fitting and pressurized section of the housing exhaust slot 37 is brought into register with another fitting 13 in the exhaust section of the housing. Assume that a slot 36 is moved into alignment with a fitting designated 11-2, then pressurized air is applied over a conduit 87 to the T-fitting 86. Pressurized air at the left end of the cylinder drives the piston 83 towards the right. As a consequence, air from the cylinder is exhausted through the T-fitting 82 over a conduit 88 to a fitting 13-2. Exhaust air is passed through the aligned openings in the fitting through the registered slot 37 and from there the air is exhausted into the chamber 33 and out the exhaust port 34.

In the illustrated embodiment of the invention the rotor slots are shown as being axially aligned, but it may be appreciated that other positionings of the slots in the rotor may be desired in order to change the timing of the application of the pressurized air and the exhaust or venting air and thus change the timing of the operation of the air cylinder. The slots 36 and 37 may be made longer or shorter to again change the timing and duration of operation of the air cylinder. Similarly, the timing of operation may be changed by positioning the fittings 11 and 13 in other than the disclosed spiral array. Further in the construction of the distributor, the material used may be steel and the rotor provided with a low friction coating or jacket while a low friction liner may be mounted on the inner cylindrical wall of the housing.

As an alternative, the plungers 48 and 68 may be dimensioned to have lengths exceeding the circumferential lengths of the slots 36 and 37. In this case, the widths of the plungers are dimensioned to be less than the widths of the slots 36 and 37 so that pressurized air is again passed through the fittings 11 while atmospheric pressure is impressed at the fittings 13 to selectively drive the air cylinder piston.

Referring to FIGS. 7, 8, and 9 of the drawings, there is shown a block 101 that is formed or bored to provide a cylindrical chamber 102 which is closed and sealed by a pair of end plates 103. A shaft 104 extends through the plates 103 and is mounted in suitable bearings. Mounted on the shaft 104 is a set of discs 105-1 to 6. Interposed between the discs are a set of smaller diameter circular spacers 106-1 to 7. The discs and the spacers constituting parts of a rotor are secured to the shaft 104 by a key 107. An air pressure manifold 109 (see FIGS. 8 and 9) is formed in one side of the housing 101 and is connected by a conduit to a source of compressed air 110. The manifold is provided with a series of entry passageways 111-1 to 3 that terminate in ports or openings situated in register with spaces or annular chambers formed between the discs 105-1 and 105-2, 105-3 and 105-4, and 105-5 and 105-6. On the opposite side of the housing, there is formed an exhaust manifold 113, open to the atmosphere, having exit passageways 114-1 to 4 opening into spaces or annular chambers formed between a first end disc 115 and disc 105-1, discs 105-2 and 105-3, discs 105-4 and 105-5 and disc 105-6 and a second end disc 116. It may be appreciated that the discs 105 and the spacers 106 are associated to provide annular exhaust chambers 117-1, 117-2, 117-3 and 117-4 and annular pressure chambers 118-1, 118-2, and 118-3.

Attention is directed to FIG. 7 where it will be noted that the housing 101 is provided with tapped holes 121-1 to 6. The tapped holes extend to ports 122-1 to 6 which are aligned with and overlay the discs 105-1 to 6. Suitable apertured adaptor fittings 10 are placed in the tapped holes 121-1 to 6 so that passages extends through the fittings to the ports 122-1 to 6 terminating the wall of the cylindrical chamber 102. The adaptor fittings 120 are connected to a number of conduits 123-1 to 6. The conduits as shown are connected in pairs to forward and rearward ends of a group of air cylinders 124 and 126, each of which has a piston which is shifted back and forth to move a piston rod which in turn controls the operation of an associated machine or mechanism (not shown).

As shown in FIGS. 10 and 11, the discs, such as disc 105-1 and disc 105-2, are provided with peripheral slots 125. Each disc may have a pair of peripheral slots which extend respectively to opposite sides of the disc. The slots are cut deep enough into the sides of the discs so that when a peripheral slot is presented to a port 122 the slot will underlie the port to communicate either an exhaust chamber 117 or a pressure chamber 118 with the port. The shaft 104 is rotated to, in turn, rotate the discs to sequentially connect the ports 122 with either an exhaust chamber or a pressure chamber to drive the associated air cylinders 123 and 126.

The shaft 104 (see FIGS. 7 and 8) is incrementally rotated by a drive mechanism which includes an air cylinder 131 that may be program controlled by a software controller, processor or a sequencer to cyclically reciprocate a piston rod 132. Attached to the piston rod 132 is a cross arm 133 secured to a rack 134 that functions to intermittently rotate a gear 136 in opposite directions. A plate 137 is secured to the side of the gear and provides a mounting for a spring urged pawl 138 that engages the teeth of a cog 139. The cog, in turn, is mounted on a stud shaft extending into a commercial gear reducer 141.

In operation, the reciprocation of the cross arm 133 and the rack 134 causes the gear 136 to oscillate back and forth and thus cause the pawl 138 to cyclically engage and rotate the cog 139. The motion of the cog is transmitted through the gear reduced device 141 to intermittently rotate the shaft 104 that in turn rotates the rotor discs 105 and spacers 106 to bring various combinations of pair of disc slots into alignment with the ports 122 to control the operation of the air cylinders 123 and 126.

More particularly, considering air cylinder 126, the rotation of the shaft 104 will move a disc slot on disc 105-5 into alignment with port 122-4 whereupon exhaust atmospheric pressure is connected from chamber 117-3 through the aligned disc slot, the port 122-4, the conduit 123-5, to the upper end of the cylinder 124. At this same time, a second slot formed in disc 105-6 is moved into position to be interposed between the pressure chamber 118-3 and the port 122-6, and the conduit 123-6 to the lower end of the cylinder 126. This pressurized air forces the cylinder piston upward exhausting the internal compressed air through conduit 123-5, through the port 122-4, and into the exhaust chamber 117-3.

Further rotation of the shaft 104 moves a second pressure slot formed in disc 105-5 into alignment with the exit port 122-4 so that pressurized air is now applied from a chamber 118-3 through the aligned slot, the port 122-4, the conduit 123-5, to the upper end of the cylinder 126. At this time, the exhaust chamber 117-4 is connected through an aligned second or exhaust disc slot, the port 122-6, and the conduit 123-6 to the lower end of the air cylinder 126, thus permitting the pressurized air in the upper end of the cylinder 126 to drive the piston downwards. The air in front of the piston is exited through the conduit 123-6. The other air cylinders, e.g., 124, may be operated in a like manner by controlling the presentation of disc slots to positions interposed between the pressure and exhaust chambers 117 and 118 and the ports 122-1-6.

The fittings running to the conduits 123 are shown as being circumferentially aligned, but it is to be understood that pairs of conduits and fittings may be spaced around the housing in other arrangements to vary the timing of operation of the respective air cylinder. Further, it is to be understood that the annular length and positioning of the slots in the discs may be varied to again change the time of initial operation and duration of operation of the air cylinder.

What is claimed is:

1. A pressurized air distributor, which comprises:
    a housing having a cylindrical chamber therein;
    a rotor mounted within said cylindrical chamber and having circumferential sections thereof spaced from the wall of said cylindrical chamber;
    means on the rotor extending outwardly to engage said cylindrical wall to form said cylindrical chamber into an annular pressure chamber and an annular exhaust chamber which completely encircle the outer circumference of said rotor;
    means for applying pressurized air to said pressure chamber;
    means for exposing said exhaust chamber to the atmosphere;
    first and second fittings mounted in said housing and having passages therethrough terminating in ports opening through said cylindrical wall into said cylindrical chamber;
    said rotor having peripheral slots which are cut into but do not extend through rotor, said slots being movable with said rotor into register with said ports to provide a first passage for pressurized air from said pressure chamber through a registered slot and port and through a first fitting, while a second passage is established from said exhaust chamber through a registered slot and port and through a second fitting; and
    means for rotating said rotor to move pairs of said peripheral slots into registration with said ports.

2. A distributor as defined in claim 1 wherein each of said fittings include:
    a plunger having a passage therethrough terminating in the port opening into said cylindrical chamber; and
    said plunger having an arcuate face riding on the periphery of said rotor; said face being dimensioned to have portions thereof riding on the periphery of the rotor while the remaining portion overlays a slot to leave a section of the slot exposed to the cylindrical chamber to open a passageway between said chamber, the slot, and the port of a fitting.

3. A distributor as defined in claim 2 which includes:
    a spring urging said plunger to ride on the periphery of the rotor.

4. A distributor as defined in claim 2 wherein said slots associated with the plungers are circumferentially elongated, and the plunger is cylindrical in shape with a diameter which is greater than the width of each associated slot and less than the length of each associated slot to impress pressurized air and atmospheric pressure through the slots and then through the fittings aligned with the slots.

5. A distributor as defined in claim 2 wherein said plunger has a width that is greater than the width of the associated slot and a length that is less than the length of the associated slot to impress pressurized air and atmospheric pressure through the slots and then through the fittings aligned with the slots.

6. A distributor as defined in claim 1 wherein the means extending outwardly from the rotor to form the pressure and exhaust chambers comprises:
    a pair of resilient O-rings mounted in grooves formed in the rotor and extending outwardly into engagement with the wall of the cylindrical chamber.

7. A distributor as defined in claim 1 wherein the slots formed in rotors are axially aligned, and the first fittings are in a first spiral array, while the second fittings are in a second spiral array.

8. A distributor as defined in claim 1 wherein said rotor comprises an alternating array of discs having peripheries extending outwardly to engage said cylindrical wall and cylindrical shaped spacers having diameters that are less than the diameters of the discs to define the pressure and exhaust chambers.

9. A distributor as defined in claim 1 wherein said first and second fittings are axially aligned with respect to the axis of the rotor, and said slots in the rotor are arrayed to be successively moved in pairs into register with ports in the pressure and exhaust chambers.

10. A distributor as defined in claim 8 wherein the rotor slots are cut into peripheries of said discs and each extends to a side wall of the respective disc to open passages from the pressure and exhaust chambers formed between pairs of discs and the ports as the slots are rotated into registration with the ports.

11. A distributor as defined in claim 8 wherein the slots are cut in the peripheries of the discs and each disc has a pair of slots which extend respectively to opposite side walls of the discs to successively apply pressurized and exhaust air from the pressure and exhaust chamber through the slots rotated into register with the ports.

12. A distributor for selectively applying pressurized air and exhaust atmospheric pressure to an air cylinder-piston device, which comprises:
    a housing having a cylindrical opening therethrough;
    a rotor mounted for rotation within said housing, said rotor having a first section with a diameter less than the diameter of said cylindrical opening to define an annular pressure chamber and second section with a diameter less than the diameter of said cylindrical opening to define an annular exhaust chamber, said annular pressure and exhaust chambers completely encircling the outer circumference of said rotor;

means on the rotor positioned on opposite sides of first section and extending outwardly of said rotor for sealing the annular pressure chamber about said first section;

means for applying atmospheric pressure to the annular exhaust chamber between said second section of the rotor and the inner surface of said cylindrical opening;

means for applying pressurized air to said annular pressure chamber;

said housing having a first passageway extending therethrough and a second passageway extending therethrough;

said rotor having a first peripheral slot formed therein which is located to be moved into alignment with said first passageway and a second peripheral slot formed therein in axial alignment with the first slot, and which is located to move into alignment with said second passageway, said first slot opening into said annular pressure chamber; and said second slot opening into said annular exhaust chamber, and said peripheral slots extending into but not through said rotor;

means for rotating said rotor to simultaneously interpose said first slot between said first passageway and said annular pressure chamber and interpose said second slot between said second passageway and said annular exhaust chamber;

means connecting said first passageway to the first cylinder to apply pressurized air to a first end of the air cylinder to drive the piston toward second end; and means connecting said second passageway to a second end of the air cylinder to exhaust the air compressed by said moving piston through said second passageway, the said second aligned peripheral slot and into said exhaust chamber.

13. A distributor for sequentially applying pressurized fluid to a group of conduits, which comprises:

a rotor having a series of axially aligned slots of predetermined length formed in the periphery thereof, said slots extending into but not through said rotor;

a casing surrounding said rotor and spaced therefrom;

means for sealing opposite ends of the space between the rotor and the casing to form an annular pressure chamber which completely encircles the circumference of said rotor;

a series of plungers mounted in the casing and having arcuate faces that ride on the periphery of the rotor and are positioned in the paths of rotation of associated slots, each plunger face having a width which is greater than the width of the associated slot and a length that is less than the length of the associated slot; said plungers being provided with axial bores;

means for impressing pressurized fluid into said annular pressure chamber;

means for coupling said plungers to the conduits; and means for rotating the cylinder to successively move each slot into register with each plunger to sequentially apply pressurized fluid from said annular pressure chamber through said slots and said plunger bores to the conduits.

14. A fluid distributor for sequentially controlling a series of fluid operated devices, which comprises:

a rotor having a series of longitudinally aligned peripheral slots which extend into but not through said rotor;

a casing mounted about the rotor and spaced therefrom, said spaced casing and rotor forming an annular chamber which completely encircles the circumference of said rotor;

means interposed between the cylinder and the casing for sealing the space over first half of the slots from the atmosphere to form an annular pressure chamber while leaving the space over the remaining half of the slots exposed to the atmosphere to form an annular exhaust chamber;

a first series of plungers having arcuate faces and central bores mounted in the casing and arrayed along a helical path so that the faces of the plungers are positioned in engagement with the cylinder and in circumferential alignment with said first half of slots;

a second series of plungers having central bores mounted in the casing and arranged along a helical path so that the faces of the plungers are positioned in engagement with the cylinder and in circumferential alignment with said second half of slots;

said first and second plungers being dimensioned to overlay a portion of said peripheral slots while having a portion of the peripheral slots exposed when the rotor is rotated to present the slots to said plungers;

means for applying a pressurized fluid into the space overlaying the first half of the slots;

means for rotating the cylinder to sequentially present each slot in said first half of slots to said first series of helically arranged plungers while presenting each slot in said second half of slots to said second series of helically arranged plungers to sequentially impress pressurized fluid from said annular pressure chamber through the sequentially presented second half of slots and the successive plungers and to sequentially apply atmospheric pressure from said annular exhaust chamber through the sequentially presented first half of slots and the successive plungers; and means connected to said first and second series of plungers for sequentially presenting pressurized fluid and atmospheric pressure to the series of fluid operated devices.

15. A fluid distributor as defined in claim 14 wherein the plungers are cylindrical in shape and each is formed with a diameter which is less than the length of an associated slot and which the diameter is greater than the width of an associated slot.

* * * * *

UNITED STATES PATENT AND TRADEMARK OFFICE
CERTIFICATE OF CORRECTION

PATENT NO. : 4,505,184

DATED : March 19, 1985

INVENTOR(S) : J. S. Mc Donald

It is certified that error appears in the above—identified patent and that said Letters Patent is hereby corrected as shown below:

Column 5, line 21, after "housing" add --and another--.

Column 6, line 58, "reduced" should read --reduction--.

Signed and Sealed this

Twentieth Day of August 1985

[SEAL]

Attest:

DONALD J. QUIGG

Attesting Officer     Acting Commissioner of Patents and Trademarks